(12) United States Patent
Griffiths et al.

(10) Patent No.: US 6,655,152 B2
(45) Date of Patent: Dec. 2, 2003

(54) FUEL CONTROL SYSTEM FOR MULTIPLE BURNERS

(75) Inventors: Michael Griffiths, Bromsgrove (GB); Trevor Stanley Smith, Sutton Coldfield (GB)

(73) Assignee: Lucas Industries Limited (GB)

( * ) Notice: Subject to any disclaimer, the term of this patent is extended or adjusted under 35 U.S.C. 154(b) by 33 days.

(21) Appl. No.: 09/962,867

(22) Filed: Sep. 25, 2001

(65) Prior Publication Data

US 2002/0038540 A1 Apr. 4, 2002

(30) Foreign Application Priority Data

Sep. 27, 2000 (GB) .............................................. 0023727

(51) Int. Cl.[7] ................................................. F02C 9/28
(52) U.S. Cl. ........................ 60/773; 60/39.281; 60/734
(58) Field of Search ............................... 60/39.281, 734, 60/773; 417/2, 3, 4, 5, 6, 7, 8

(56) References Cited

U.S. PATENT DOCUMENTS

| | | | | | |
|---|---|---|---|---|---|
| 4,004,412 A | * | 1/1977 | Burnell | .................... | 60/39.281 |
| 4,208,871 A | * | 6/1980 | Riple | ....................... | 30/39.281 |
| 5,118,258 A | * | 6/1992 | Martin | ......................... | 60/734 |
| 2001/0054290 A1 | * | 12/2001 | Herbison et al. | ............. | 60/734 |

FOREIGN PATENT DOCUMENTS

WO    WO 01/20148 A2    * 3/2001

* cited by examiner

Primary Examiner—Louis J. Casaregola
(74) Attorney, Agent, or Firm—Michael Best & Friedrich LLP

(57) ABSTRACT

A control system is provided for use in controlling fuel supply to at least two sets of burners of an engine. The control system comprises two or more fuel pumps, each of the pumps being driven, in use, by a respective variable-speed motor. A control arrangement is provided for controlling the speed of the motors so as to regulate the rate of flow of fuel to each of the sets of burners.

16 Claims, 4 Drawing Sheets

FUEL CONTROL SYSTEM FOR MULTIPLE BURNERS

This invention relates to a control system for controlling the fuel supply to a combustion engine having two or more sets of burners.

In staged combustion gas turbine engines, the arrangement of the burners commonly includes a set of pilot burners, which are on at all times when the engine is running, a set of idling burners, providing a steady low speed operation when the engine is at idle, and one or more sets of main burners, which are fired in stages as thrust demand increases. Ideally, the control system for controlling the supply of fuel to the burners should have the ability to maintain the rate of fuel flow to each set of burners, even when the flow to other sets is changing. Problems can arise with single pump control systems as a reduction in flow can occur in the fuel supply to the pilot and idling burners when a set of main burners is switched on.

In staged combustion gas turbine engines, it is also a requirement to be able to purge the part of the fuel supply path to a set of burners exposed to high ambient temperatures when the burners are switched off, otherwise the paths are liable to block as a result of solid carbon particles forming in the residual fuel. Furthermore, once a path has been purged it is desirable to minimise the delay that occurs in refilling the path when the burners are next switched on. It is also desirable that, since failure of the fuel supply will cause the engine to shut down with potentially dangerous consequences, for example on aircraft, the system should contain some form of back up or redundancy.

It is an object of the invention to provide a fuel supply control system in which at least one of these requirements is met or one of the aforementioned problems is alleviated.

According to a first aspect of the present invention there is provided a control system for use in controlling fuel supply to at least two sets of burners of an engine, the control system comprising two or more fuel pumps, each of the pumps being driven, in use, by a respective variable-speed motor, and control means for controlling the speed of the motors so as to regulate the rate of flow of fuel to each of the burners.

Preferably, each of the fuel pumps is driven by means of a variable-speed electric motor.

In one embodiment, the control system may comprise two pumps, each of the pumps having an inlet and an outlet, a first fuel flow path through which fuel flows, in use, from the outlet of a first one of the pumps to a set of pilot burners and to a set of idling burners, and a further fuel flow path through which fuel flows from the outlet of the other of the pumps to a set of further burners, the set of idling burners and each set of further burners each preferably having, associated therewith, respective staging valve arrangements.

The staging valve arrangements may be electrically operated valves. Alternatively, pressure operated check valves may be used.

The control system may further comprise means for controlling operation of the staging valve arrangements.

Preferably, the set of further burners comprises a first set of main burners and a second set of main burners. The control means may take the form of an electronic controller associated with the aircraft engine.

It is an advantage of the invention that the flow of fuel through the pumps may be rapidly increased to a higher level for a short period of time (i.e. "spiked"), in order to substantially maintain the rate of flow of fuel to one or more sets of burners when another or others of the sets of burners are switched on (i.e. during priming of the newly switched on burners). Additionally, the control algorithms are simpler if each fuel flow path is supplied with fuel from a separate electrically driven pump.

The first fuel flow path may be provided with a first flow sensing valve for monitoring the rate of fuel flow through the first fuel flow path, whereby the first flow sensing valve provides a first output signal indicative of the rate of flow of fuel through the first fuel flow path, the control means receiving the first output signal such that the speed of at least one of the motors is controlled in response to the first output signal.

The further fuel flow path may be provided with a further flow sensing valve for monitoring the rate of fuel flow through the further fuel flow path, whereby the further flow sensing valve provides a further output signal indicative of the rate of flow of fuel through the further fuel flow path, the control means receiving the further output signal such that the speed of at least one of the motors is controlled in response to the further output signal.

Conveniently, at least one of the first or further flow sensing valves may be provided with a position sensor for monitoring the position of the associated flow sensing valve, the position sensor providing an output signal indicative of the rate of flow of fuel through the respective fuel flow path.

A linear variable differential transducer (LVDT) may be used as the position sensor.

In one embodiment of the invention, the further fuel flow path may be provided with a split valve arrangement for dividing the fuel flow into first and second staging fuel flow paths. In use, fuel flows through the split valve arrangement into the first staging fuel flow path to a first set of main burners and into the second staging fuel flow path to a second set of main burners, the proportion of the total flow of fuel into the split valve that flows to the first set of main burners being controlled by controlling the position of the split valve arrangement.

Each staging fuel flow path may be provided with a flow sensing valve for monitoring the rate of fuel flow through the respective staging fuel flow path, whereby the flow sensing valve associated with each staging fuel flow path provides an output signal indicative of the rate of flow of fuel through the associated staging fuel flow path.

In any of the embodiments herein described, the fuel flow path delivering fuel to the set of pilot burners may be provided with a pressure raising shut-off valve (PRSOV), which serves to maintain a fuel pressure within the system above a predetermined value and prevents the flow of fuel to the set of pilot burners if the fuel pressure falls below a predetermined value.

Conveniently, the outlets of the pumps may be connected to each other to form a common supply for each set of burners. For example, for an engine having three sets of burners, the common supply may deliver fuel to first, second and third fuel flow paths associated with the first, second and third sets of burners respectively. Each of the first, second and third flow paths may be provided with a flow regulating valve and a flow sensing valve, the control means including a means of controlling the flow regulating valves in response to an output signal provided by the respective flow sensing valve.

It is an advantage of this embodiment of the invention that failure of one of the pumps will not give rise to a complete loss of fuel supply to all of the burners and will permit continued operation of the engine.

Each flow regulating valve may include an inlet port and an outlet port, the flow regulating valve being movable to an open position in which fuel at high pressure is able to flow through the associated fuel flow path to the associated set of burners.

Each flow regulating valve may further include a low pressure inlet port and a low pressure outlet port, the flow regulating valve being movable to a closed position in which high pressure fuel flow is prevented but fuel at low pressure is able to flow through the low pressure inlet port, through the low pressure outlet port and into the associated fuel flow path to permit priming of the associated set of fuel manifolds with low pressure fuel.

Each main manifold may have an associated air vent valve arrangement, the air vent valve arrangement being opened during priming of the respective main manifold in order that air and/or other gases in the respective fuel flow path is able to escape through the air vent valve arrangement. Any low pressure fuel which may escape through the air vent valve arrangement flows to a low pressure drain. On completion of the priming of a set of burners, the air vent valve arrangement is closed, the respective flow regulating valve remains closed and flow of the low pressure fuel to the main burners is prevented by the staging valves which remain closed.

Conveniently, the PRSOV associated with the pilot burners, may be used to purge the manifolds and fuel supply paths between the flow regulating valves and the associated burners on shut down by permitting fuel in the fuel flow path through which fuel flows to the associated set of burners to flow through the PRSOV to the low pressure drain after the burners have been switched off.

According to a second aspect of the invention, a method of controlling fuel supply to at least two sets of burners comprises the steps of providing two or more fuel pumps, driving each of the fuel pumps by a respective variable-speed motor, and controlling the speed of the motors so as to regulate the rate of flow of fuel to each of the sets of burners.

It will be appreciated that the preferred and/or optional features of the first aspect of the invention may be used to carry out preferred and/or optional steps of the second aspect of the invention.

Various embodiments of the invention will now be described with reference to the accompanying drawings.

Figure 3:
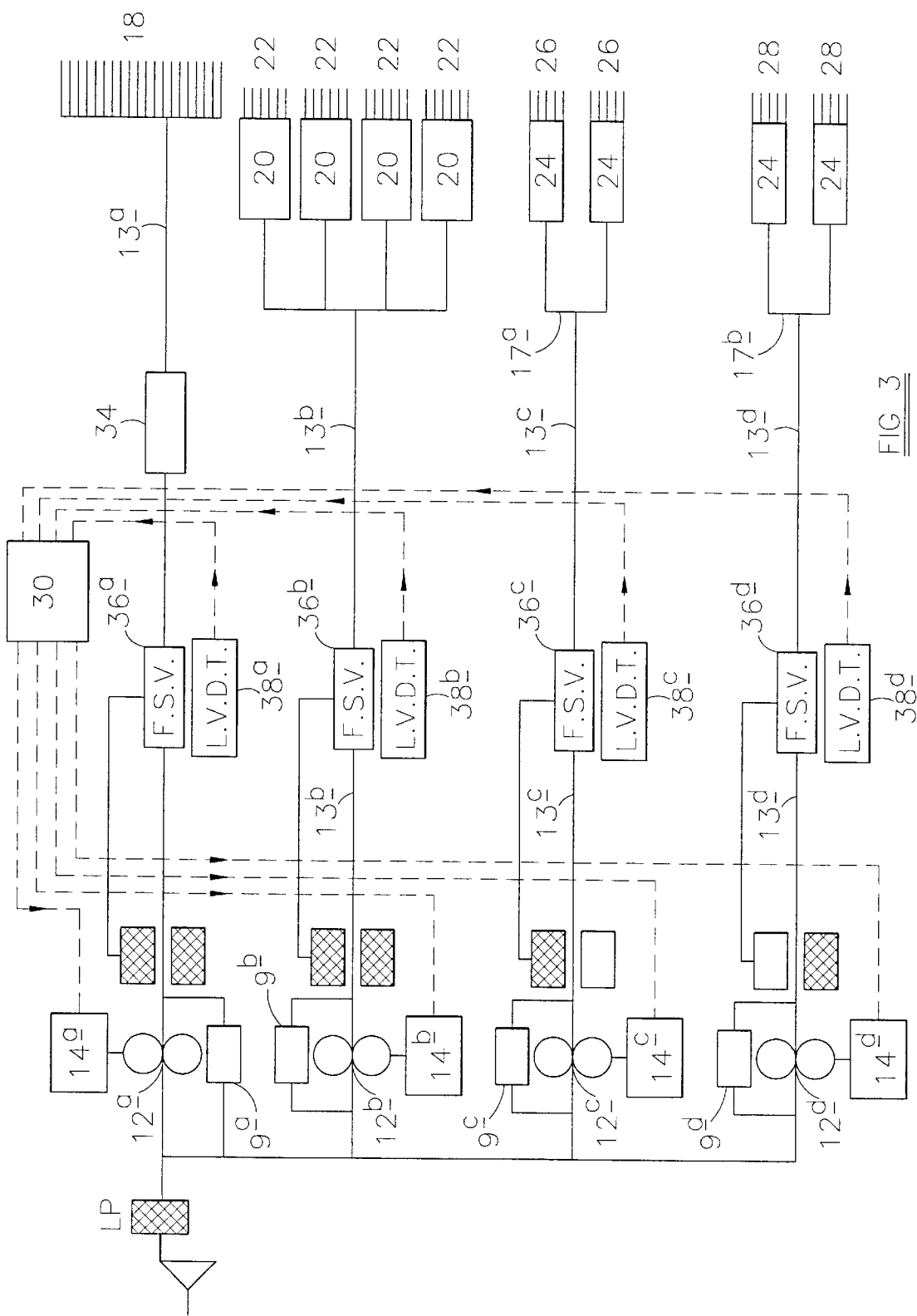
Figure 4:
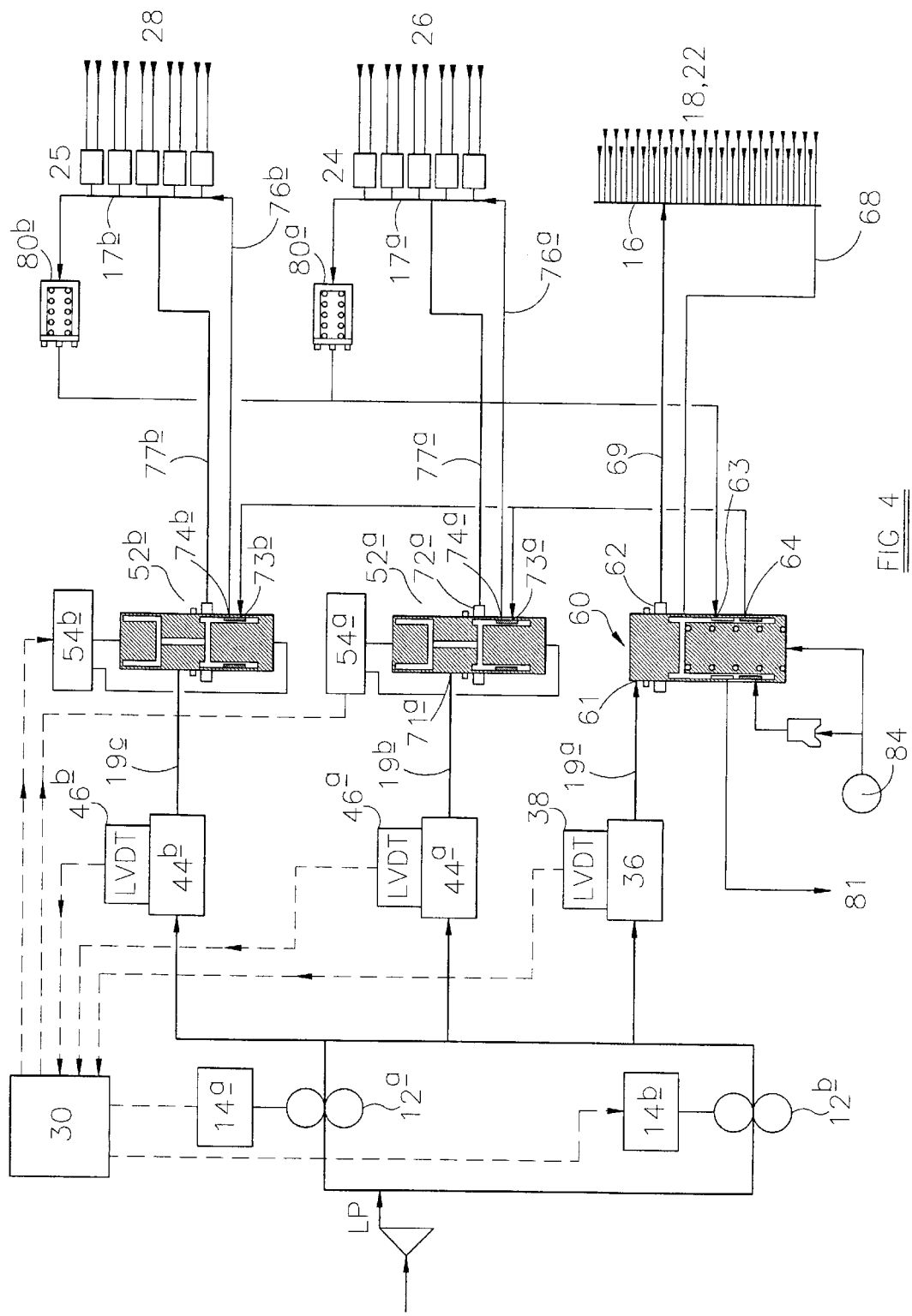

FIG. 3 is a schematic block diagram of a staged combustion gas turbine engine control system using four electrically driven pumps in accordance with a further alternative embodiment of the present invention; and FIG. 4 is a schematic block diagram of a staged combustion gas turbine engine control system in accordance with a further alternative embodiment of the present invention, in which the sets of burners may be primed and purged.

Figure 1:
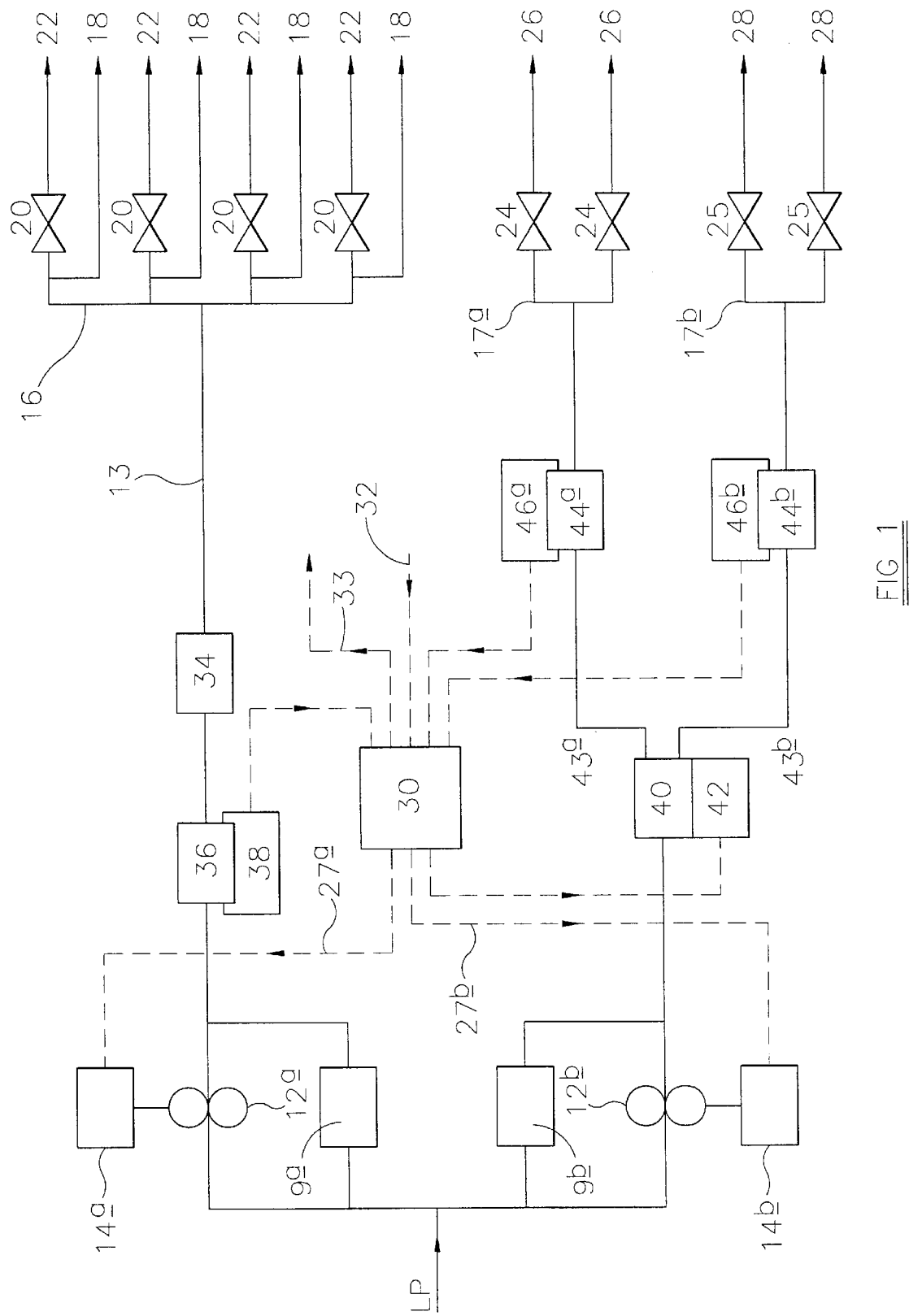
FIG. 1 is a schematic block diagram of a staged combustion gas turbine engine control system using two electrically driven pumps in accordance with an embodiment of the present invention.

As shown in FIG. 1, fuel at low pressure, LP, is supplied to the inlets of two positive displacement pumps 12a, 12b, which are driven by respective variable speed electric motors 14a, 14b, each of the pumps having an associated relief valve 9a, 9b. A first one of the pumps 12a delivers fuel at a high pressure to the inlet manifold 16 of a set of pilot burners 18 and a set of idling burners 22 through a fuel flow path 13, the fuel flow path 13 being provided with a flow sensing valve 36 and a pressure raising shut-off valve 34. The idling burners have, associated therewith, staging valves 20 which are operable between an open position, in which fuel in the flow path is delivered to the idling burners 22, and a closed position in which such fuel delivery is prevented. The other fuel pump 12b delivers fuel at a high pressure to the inlet manifolds 17a, 17b of further sets of main burners 26, 28, each having an associated staging valve arrangement 24, 25 respectively. The fuel supply to the sets of main burners 26, 28 is divided by means of a split valve arrangement 40, the position of which is controlled by means of a motor 42, the split valve arrangement 40 being arranged such that the common supply of fuel from the pump 12b is delivered to first and second flow paths 43a, 43b, the first flow path 43a delivering fuel to the main burners 26 and the second flow path 43b delivering fuel to the main burners 28. Each of the flow paths 43a, 43b is provided with a flow sensing valve 44a, 44b for monitoring the rate of fuel flow through the respective flow path 43a, 43b.

Conveniently, each of the flow sensing valves 36, 44a, 44b, is provided with a linear variable differential transducer (LVDT) 38, 46a, 46b respectively for monitoring the position of a valve member forming part of the respective flow sensing valve, each of the LVDTs 38, 46a, 46b providing an output signal which is indicative of the rate of flow of fuel through the respective flow path. The output signals generated by the LVDTs 38, 46a, 46b are provided to a control unit 30, conveniently a computer or an electronic control means with a computer interface, which generates control signals 27a, 27b for controlling the speed of the pump motors 14a, 14b respectively in response to the LVDT output signals. The control unit 30 may also receive other demand signals 32 from the engine, as would be familiar to a person skilled in the art. The control unit 30 is also arranged to provide control signals 33 to control the opening and closing of the staging valves 20, 24, 25 at the desired stage in the engine operating procedure. Although electrically operated staging valves 20, 24, 25 are described, it is also possible to use pressure operated check valves.

In use, fuel is delivered by the pump 12a to the set of pilot burners 18 which are ignited on start-up. At an appropriate time, the control unit 30 generates a control signal 33 to cause the staging valves 20 associated with the set of idling burners 22 to open so as to permit fuel to flow thereto, the set of pilot burners 18 causing ignition of the idling burners 22. The LVDT associated with the flow sensing valve 36 provides an output signal to the control unit 30 which is indicative of the rate of fuel flow through the flow path 13. When the staging valves 20 are opened, and in response to the measured fuel flow rate, the control unit 30 provides a control signal 27a to the electric motor 14a, whereby the speed of the electric motor 14a is varied so as to ensure the flow of fuel to the pilot burners 18 and idling burners 22 is maintained at a predetermined required rate.

Following ignition of the idling burners, and in response to the appropriate demand signal 32 from the engine, the control unit 30 increases the speed of the second pump 12b and generates a further control signal 33 to open at least one of the staging valves 24, 25 associated with the sets of main burners 26, 28 respectively, thereby permitting fuel to flow from the second pump 12b, through the flow paths 43a, 43b to the sets of main burners 26, 28, the main burners 26, 28 being ignited by the pilot burners 18. The LVDTs 46a, 46b associated with the flow sensing valves 44a, 44b respectively monitor the fuel flow rates through the flow paths 43a, 43b and provide output signals, indicative of the rates of fuel flow to each of the sets of main burners 26, 28, to the control unit 30. The control unit 30 provides an output signal to the motor 42 to control the position of the split valve arrangement 40 and provides an output signal 27b to control the speed of the electric motor 14b associated with pump 12b so as to ensure the flow of fuel to both the sets of main burners 26, 28 is maintained at a substantially constant rate.

The invention provides the advantage that the fuel flow rates to all sets of burners may be substantially maintained during operation of the engine, including periods during which other sets of burners are being primed after being selected for switching on. A further advantage of the present invention is that the use of electrically driven pumps removes the requirement for a spillback loop, as used on mechanically driven pumps, and reduces the heat rejection of the system. The invention also enables electrically driven fuel pumps having different operating parameters to be selected to suit the range of fuel flow rates required by different sets of burners. Furthermore, in order to control fuel flow rates in two or more fuel flow paths, it is computationally easier to program the control unit 30 so as to control two electrically driven pumps than to control a single pump to achieve the same purpose.

It will be appreciated that further pumps, and further flow paths, may be included in the system to control fuel supply to further sets of burners, if required.

Figure 2:
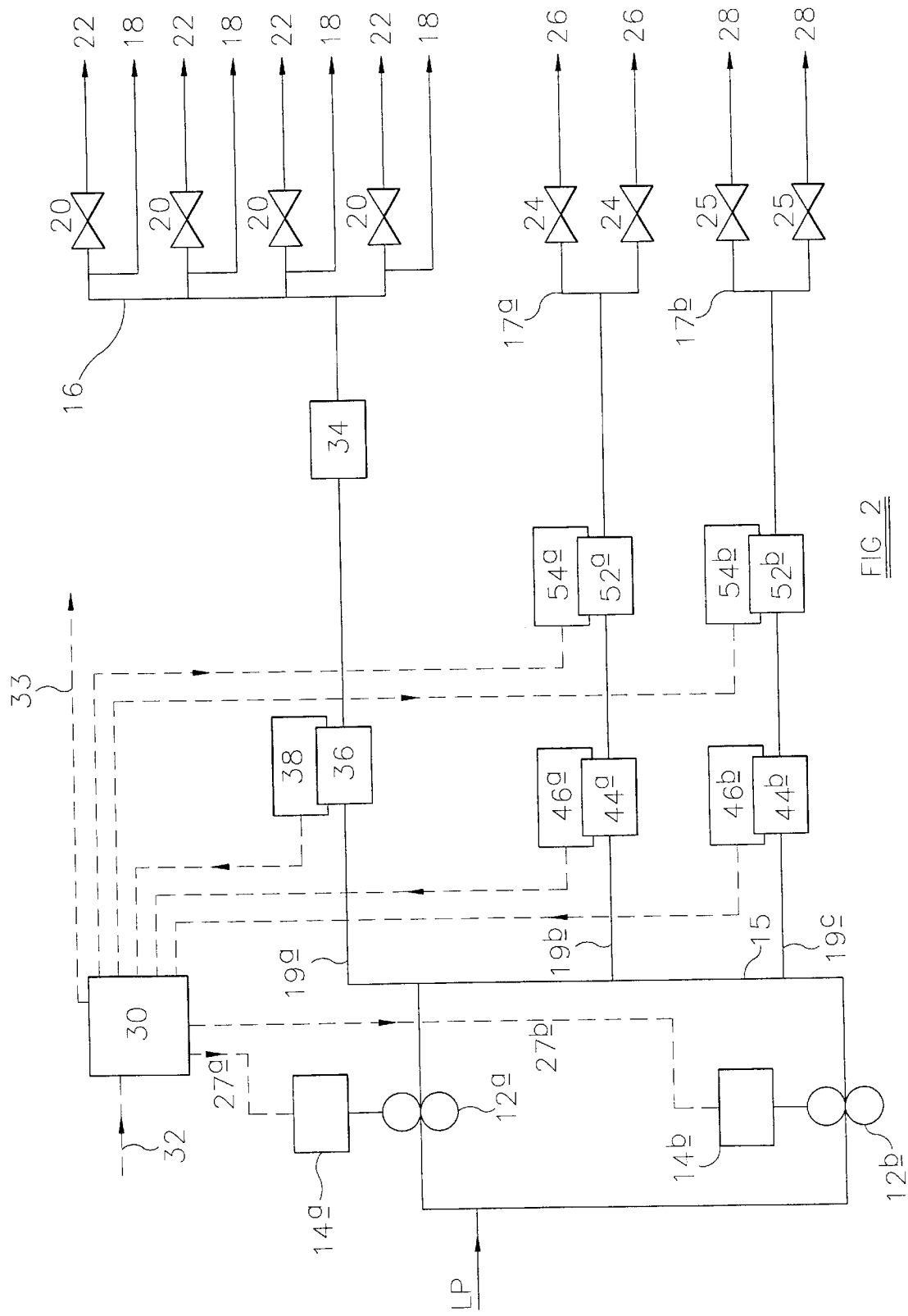
FIG. 2 is a schematic block diagram of a staged combustion gas turbine engine control system using two electrically driven pumps in accordance with an alternative embodiment of the present invention, with the pump outlets connected to each other to form a common supply.

An alternative embodiment of the invention is shown in FIG. 2, in which fuel at low pressure LP is supplied to the inlets of two positive displacement pumps 12a, 12b, each of which is driven by an associated variable speed electric motor 14a, 14b respectively. The outlets of the pumps 12a, 12b are coupled together to form a common supply path 15 which delivers fuel to the manifold 16 of a set of pilot burners 18 and staging valves 20 associated with idling burners 22 through a first flow path 19a. The flow path 19a is provided with a flow sensing valve 36 having an associated LVDT 38 and a PRSOV 34. As described previously, the LVDT 38 provides an output signal to the control unit 30 which provides an indication of the rate of flow of fuel through the flow path 19a.

The common supply path 15 also delivers fuel to first and second additional flow paths 19b, 19c which deliver fuel to the manifolds 17a, 17b of further sets of main burners 26, 28 respectively provided with staging valves 24, 25 respectively. The additional flow paths 19b, 19c are also provided with flow sensing valves 44a, 44b, each valve 44a, 44b having an associated LVDT 46a, 46b respectively which provides an output signal, indicative of the rates of fuel flow through the associated flow path 19b, 19c, to the control unit 30. Each additional flow path 19b, 19c is further provided with a flow regulating valve 52a, 52b actuated by an associated motor arrangement 54a, 54b. The control unit 30 provides signals 33 to control the opening and closing of the staging valves 20, 24, 25 and also provides signals to control the motor arrangements, 54a, 54b and the electric motors 14a, 14b in response to signals 32 from the engine and from the LVDTs 38, 46a, 46b.

In use, the system in FIG. 2 operates in a similar manner to that described previously, except that the flow rate of fuel in each of the flow paths 19a, 19b, 19c is controlled by providing signals from the control unit 30, in response to the output signals from the LVDTs 38, 46a, 46b, to the motor arrangements 54a, 54b for the flow regulating valves 52a, 52b as well as to the electric motors 14a, 14b associated with the pumps 12a, 12b. It will be appreciated that the total fuel flow entering the common supply path 15 is controlled by providing signals 27a, 27b to vary the speed of the electric motors 14a, 14b in response to the output signals from the LVDTs 38, 46a, 46b.

In addition to the advantages described hereinbefore, the embodiment of the invention in FIG. 2 provides the further advantage that, as the pumps 12a, 12b are arranged in parallel, fuel supply to the engine can be substantially maintained, even if one of the pumps 12a, 12b should fail. It will be appreciated that further pumps, and further flow paths, may be included in the system in FIG. 2 to control fuel supply to further sets of burners, if required.

Another alternative embodiment of the invention is shown in FIG. 3, in which fuel at low pressure, LP, is supplied to the inlets of four positive displacement pumps 12a, 12b, 12c, 12d, driven by associated variable speed electric motors 14a, 14b, 14c, 14d, respectively. In this arrangement, the pilot burners 18 are supplied with fuel through a first flow path 13a from pump 12a and the idling burners 22 are supplied with fuel through a second flow path 13b from pump 12b. Two sets of further, main burners 26, 28 are each supplied with fuel through associated third and fourth flow paths 13c, 13d from associated pumps 12c, 12d respectively. The operation is similar to that described previously with reference to FIGS. 1 and 2, the motors 14a, 14b, 14c, 14d being controlled by signals from the control unit 30, which are generated in response to the output signals from the LVDTs 38a, 38b, 38c, 38d associated with the flow sensing valves 36a, 36b, 36c, 36d such that the fuel flow rate to each set of burners is substantially maintained during engine operation. In particular, the fuel flow rate to each set of burners can be maintained during periods in which the fuel supply to other sets of burners is initiated, for example upon opening of the associated staging valves.

In this arrangement, it will be appreciated that the flow to each set of burners can be controlled independently by varying the speed of the electric motor driving the associated pump, each of which supplies fuel to only one set of burners.

A further alternative embodiment of the invention is shown in FIG. 4 in which similar parts to those described previously are denoted with like reference numerals. In this embodiment of the invention, the control system includes a valve arrangement 60 which takes the form of a PRSOV which is also used to purge the manifolds at shut down. The PRSOV 60 has an inlet port 61 in communication with the fuel supply flow path 19a and an outlet port 62 in communication with a flow path 69, the flow path 69 being in communication with the inlet manifold 16 of the pilot and idling burners 18, 22.

When the PRSOV 60 is open, high pressure fuel is able to flow from the flow path 19a into the inlet port 61, through the valve 60 and out through the outlet port 62 into flow path 69 for delivery to the burners 18, 22. With the PRSOV 60 in this position, fuel from a low pressure fuel supply 84 is also able to flow through the PRSOV 60 into a flow path 75 through an outlet port 64. Additionally, a further port 63 of the PRSOV 60 is in communication with a low pressure drain 81, the further port 63 also being in communication with a common flow path 82 which is provided with first and second air vent valve arrangements 80a, 80b associated with the sets of main burners 26, 28 respectively.

The flow regulating valve 52a is movable between a position in which high pressure fuel is able to flow from the flow path 19b, through the valve 52a and into a flow path 77a in communication with the inlet manifold 17a of the main burners 26 and a position in which low pressure fuel flowing through PRSOV 60 is able to flow through the flow path 75, into the priming flow path 76a. The flow regulating valve 52b is operable in a similar manner so as to permit either high pressure fuel from the flow path 19c to flow through the valve 52b to a flow path 77b in communication with the inlet manifold 17b of the burners 28 or to permit low pressure fuel flowing through the PRSOV 60 to flow through the flow path 75, into the priming flow path 76b.

With the PRSOV 60 in an open position, and the valves 52a, 52b closed, low pressure fuel is delivered through the flow path 75, to the priming flow paths 76a, 76b which communicate with the inlet manifolds 17a, 17b of the burners 26, 28 respectively.

The control system shown in FIG. 4 may also be used to prime the flow paths 77a, 77b with low pressure fuel prior to ignition of the associated burners and to purge the flow paths 77a, 77b, 69 at shut down.

When the pilot burners 18 are to be ignited, the PRSOV 60 is moved to a position in which high pressure fuel is able to flow through the inlet port 61, through the PRSOV 60 and out through the outlet port 62 into the flow path 69.

When it is required to ignite the idling burners, staging valves (not shown in FIG. 4) associated with the idling burners are opened, as described previously, to permit fuel under high pressure to be delivered to the idling burners.

Prior to their ignition, the main manifolds 17a, 17b are primed with low pressure fuel by moving the PRSOV 60 to a position in which low pressure fuel is able to flow through the PRSOV into the flow path 75. With the flow regulating valves 52a, 52b in their closed positions, low pressure fuel is able to flow from the flow path 75 into the priming flow paths 76a, 76b and into the inlet manifolds 17a, 17b. Additionally, the air vent valve arrangements 80a, 80b are opened, allowing air and/or other gases to escape as the fuel fills the manifolds 17a, 17b and, hence, the flow paths 77a, 77b. Any fuel escaping through the air vent valve arrangements 80a, 80b is returned through flow path 82 to the low pressure drain 81 through the PRSOV 60.

Before ignition of the main burners 26, the staging valve arrangement 24 associated with the main burners 26 is opened, the air vent valve arrangement 80a is closed and the valve 52a is opened so that high pressure fuel is able to flow through the valve 52a into the flow path 77a for delivery to the burners 26. It will be appreciated that, under such circumstances, the delivery of low pressure fuel through the PRSOV 60 to the inlet manifold 17a of the burners 26 is prevented.

Prior to their ignition, the main burners 28 are primed in a similar manner to that described previously for the main burners 26.

On switching off the main burners 26, the staging valves associated therewith are closed and provided the PRSOV 60 is open, the associated flow paths remain filled with low pressure fuel from the low pressure fuel supply 84. Operating the flow regulating valve 52a to shut off the flow of high pressure fuel to the inlet manifold 17a enables fuel to flow through the PRSOV 60 from the supply 84 to the manifold 76a. On switching off the main burners 28, the associated flow paths are filled with low pressure fuel in a similar manner.

When the engine is running and the sets of main burners 26 and/or 28 are switched off, purging of the injectors downstream of the staging valves is carried out using combustion air by means of a conventional technique which would be familiar to a person skilled in the art. The main manifolds 17a, 17b remain full of LP fuel.

On switching off the idling and pilot burners 18, 22, the staging valves associated therewith are closed and the associated flow paths are purged by closing the PRSOV 60 so that the supply of high pressure fuel to the pilot and idling burners is prevented and fuel in the inlet manifold 16 is able to flow through the PRSOV 60 to purge the manifolds 16, 17a, 17b as follows.

Air from the engine's combustion chamber flows through the pilot burners 18 into the manifold 16 and via the flow path 68 to the PRSOV 60. With the PRSOV 60 closed, the flow path 68 communicates with the flow path 82 and air is able to flow into the manifolds 17a, 17b via the air vent valve arrangements 80a, 80b respectively. Air flows through the flow paths 76a, 76b, through the valves 52a, 52b and into the flow path 75 which communicates, via the PRSOV 60, with the low pressure drain 81. In this way, the manifolds 16, 17a and 17b are purged with air when the engine is shut down.

It should be noted that some engines do not require purged manifolds and therefore the above steps would not be necessary.

The advantages of this system are that priming is undertaken at engine start up, thereby ensuring no delay is incurred in supplying the required flow rate of fuel to the burners when they are switched on. Those parts of the fuel supply path to a set of burners which are exposed to high ambient temperatures are also purged when the burners are switched off.

It will be appreciated that the control system of the present invention may be extended to include a greater number of pumps and a greater or lesser number of sets of burners and associated valves, whilst still achieving the aforementioned advantages of the present invention. It will further be appreciated that in any of the embodiments of the invention, the speed of the pump(s) need not be controlled in response to the measured fuel flow rate to the burners but may be controlled in response to other demand signals from the engine. It will further be appreciated that the control system described may be used in conjunction with any type of pump having a variable speed drive arrangement.

We claim:

1. A control system for use in controlling fuel supply to at least two sets of burners of an engine, the control system comprising two or more fuel pumps, each of the pumps being driven, in use, by a respective variable-speed motor, and a control arrangement for controlling the speed of the motors so as to regulate the rate of flow of fuel from said pumps to said burners, said control arrangement including flow sensor means monitoring the rate of flow of fuel output from said pumps and providing a corresponding control input to said control arrangement for effecting said motor speed control.

2. The control system as claimed in claim 1 wherein each of the fuel pumps is driven by means of a variable-speed electric motor.

3. The control system as claimed in claim 1 wherein the control system comprises two pumps, each of the pumps having an inlet and an outlet, a first fuel flow path through which fuel flows, in use, from the outlet of a first one of the pumps to a set of pilot burners of the engine and to a set of idling burners of the engine, a further fuel flow path through which fuel flows from the outlet of the other of the pumps to one or more sets of further burners of the engine, the set of idling burners and each set of further burners each having, associated therewith, a respective staging valve arrangement, the control arrangement being arranged to control operation of the staging valve arrangements.

4. The control system as claimed in claim 3 wherein the first fuel flow path is provided with a first flow sensing valve for monitoring the rate of fuel flow through the first fuel flow path, whereby the first flaw sensing valve provides a first output signal indicative of the rate of flow of fuel through the first fuel flow path, wherein the control arrangement is arranged to receive the first output signal such that the speed of at least one of the motors is controlled in response to the first output signal.

5. The control system as claimed in claim 4 wherein the further fuel flow path is provided with a further flow sensing valve for monitoring the rate of fuel flow through the further fuel flow path, whereby the further flow sensing valve provides a further output signal indicative of a rate of flow of fuel through the further fuel flow path, wherein the control arrangement is arranged to receive the further output signal such that the speed of at least one of the motors is controlled in response to the further output signal.

6. The control system as claimed in claim 5 wherein at least one of the first or further flow sensing valves is provided with a position sensor for monitoring the position of the associated flow sensing valve, the position sensor being arranged to provide an output signal indicative of the rate of flow of fuel through the respective fuel flow path.

7. The control system as claimed in claim 3 wherein the further fuel flow path is provided with a split valve arrangement for dividing the fuel flow into first and second staging fuel flow paths and whereby, in use, fuel flows through the split valve arrangement into the first staging fuel flow path to a first set of main burners and into the second staging fuel flow path to a second set of main burners, the proportion of the total flow of fuel into the split valve arrangement that flows to the first set of main burners being controlled by controlling the position of the split valve arrangement.

8. The control system as claimed in claim 7 wherein each staging fuel provided with a flow sensing valve for monitoring the rate of fuel flow through the respective staging fuel flow path, whereby the flow sensing valve associated with each staging fuel flow path provides an output signal indicative of the rate of flow of fuel through the associated staging fuel flow path.

9. The control system as claimed in claim 1 wherein the outlets of the pumps are connected to each other to form a common supply from which is provided a flow path for supplying fuel to each set of burners, including two sets of main burners.

10. The control system as claimed in claim 9 wherein each flow path for supplying fuel to cart set of main burners is provided with a flow regulating valve and a flow sensing valve, the control arrangement being arranged to control each of the flow regulating valves in response to an output signal provided by the respective flow sensing valve.

11. The control system as claimed in claim 10 wherein each flow regulating valve further includes a low pressure inlet port and a low pressure outlet port, the flow regulating valve being movable to a closed position for preventing high pressure fuel flow to the associated set of main burners and for enabling fuel at low pressure to flow through the low pressure inlet port, the low pressure outlet port and an associated fuel flow path to permit priming of an associated fuel manifold with low pressure fuel.

12. The control system as claimed in claim 11 wherein the associated fuel manifold is a main burner manifold, each main burner manifold having an associated air vent valve arrangement, the control system being arranged to open the air vent valve arrangement during priming of the associated main burner manifold in order that air and/or other gases in the associated fuel flow path are able to escape through the air vent valve arrangement.

13. The control system as claimed in claim 1 wherein at least one set of burners is a set of pilot burner, the fuel flow path delivering fuel to a set of pilot burners being provided with a pressure raising shut-off valve (PRSOV) for maintaining a fuel pressure within the system above a predetermined value and for preventing the flow of fuel to the set of pilot burners if the fuel pressure falls below the predetermined value.

14. The control system as claimed in claim 13, wherein the control arrangement is ranged to control the PRSOV associated with the pilot burners so as to purge manifolds and fuel flow paths of an associated set of main burners on shut down by permitting fuel in the associated fuel flow paths to flow through the PRSOV to a low pressure drain after the burners have been switched off.

15. The control system as claimed in claim 1 wherein the control arrangement takes the form of an electronic controller associated with the engine.

16. A method of controlling fuel supply to at least two sets of burners of an engine comprising providing two or more fuel pumps, driving each of the fuel pumps by a respective variable-speed motor, and controlling the speed of the motors so as to regulate the rate of flow of fuel to each of the sets of burners.

* * * * *